(12) United States Patent
Meza et al.

(10) Patent No.: US 11,020,695 B2
(45) Date of Patent: Jun. 1, 2021

(54) CARTRIDGE PUMP

(71) Applicant: FLOW CONTROL LLC., Beverly, MA (US)

(72) Inventors: Humberto V. Meza, Trabuco Canyon, CA (US); Bernard L. Perkins, Orange, CA (US)

(73) Assignee: FLOW CONTROL LLC, Beverly, MA (US)

( * ) Notice: Subject to any disclaimer, the term of this patent is extended or adjusted under 35 U.S.C. 154(b) by 0 days.

(21) Appl. No.: 15/167,534

(22) Filed: May 27, 2016

(65) Prior Publication Data

US 2017/0021293 A1    Jan. 26, 2017

Related U.S. Application Data

(60) Provisional application No. 62/166,988, filed on May 27, 2015.

(51) Int. Cl.
*B01D 35/26* (2006.01)
*B01D 29/96* (2006.01)
(Continued)

(52) U.S. Cl.
CPC .............. *B01D 35/26* (2013.01); *B01D 29/96* (2013.01); *B01D 35/02* (2013.01); *B67D 1/10* (2013.01);
(Continued)

(58) Field of Classification Search
CPC ...... B01D 35/02; B01D 35/147; B01D 35/26; B01D 35/306; B01D 35/30; B01D 29/96;
(Continued)

(56) References Cited

U.S. PATENT DOCUMENTS 3,667,499 A    6/1972 Branton et al.
3,907,688 A    9/1975 Close
(Continued)

FOREIGN PATENT DOCUMENTS

CA    2381309 A1    7/2002
CN    1123198 A     5/1996
(Continued)

OTHER PUBLICATIONS

Manitowoc Beverage Systems, Beverage Master Parts List, Part 9 of 13: Water Systems, issued Mar. 9, 2012 (11 pages).
(Continued)

*Primary Examiner* — Robert Clemente
*Assistant Examiner* — Akash K Varma
(74) *Attorney, Agent, or Firm* — Ware, Fressola, Maguire & Barber LLP (57) ABSTRACT

The present invention provides a pump cartridge, which is directly connected in-line with one or more filter cartridges in a mounting bracket. It may be paired with an accumulator tank for a pump version, and with no accumulator tank for a smart pump version. The inline design reduces the size of the system, the amount of connections, and the amount of hose required to install the system, which in turn reduces the space required for installation, the number of potential leak paths, and the likelihood of failure of the system due to issues with the hose.

19 Claims, 9 Drawing Sheets

(51) Int. Cl.
*B01D 35/02* (2006.01)
*B67D 1/10* (2006.01)
*C02F 1/00* (2006.01)
*C02F 1/44* (2006.01)
*B67D 7/76* (2010.01)
*F04B 1/00* (2020.01)
*F04B 53/20* (2006.01)
*F04B 53/22* (2006.01)
*F04B 53/16* (2006.01)

(52) U.S. Cl.
CPC ............... *B67D 7/76* (2013.01); *C02F 1/001* (2013.01); *C02F 1/008* (2013.01); *C02F 1/441* (2013.01); *F04B 1/00* (2013.01); *F04B 53/16* (2013.01); *F04B 53/20* (2013.01); *F04B 53/22* (2013.01); *B67D 2210/0001* (2013.01); *C02F 2201/006* (2013.01); *C02F 2209/001* (2013.01); *C02F 2209/03* (2013.01)

(58) Field of Classification Search
CPC .. C02F 1/00; C02F 1/001; C02F 1/008; C02F 1/441; C02F 1/44
USPC ........................................................ 210/232
See application file for complete search history.

(56) References Cited

U.S. PATENT DOCUMENTS

| | | |
|---|---|---|
| 4,072,184 A | 2/1978 | Hinkle |
| 4,165,951 A | 8/1979 | Friedman et al. |
| 4,188,995 A | 2/1980 | Hinkle |
| 4,332,685 A | 6/1982 | Nowlin et al. |
| 4,339,307 A | 7/1982 | Ellis, Jr. |
| 4,637,435 A | 1/1987 | Chirdon |
| 4,678,565 A | 7/1987 | Norton |
| 4,759,474 A | 7/1988 | Regunathan et al. |
| 4,761,295 A | 8/1988 | Casey |
| 4,836,409 A | 6/1989 | Lane |
| 4,857,184 A | 8/1989 | DeLoach |
| 5,333,660 A | 8/1994 | Kohlmann et al. |
| 5,519,743 A | 5/1996 | van de Venne et al. |
| 5,539,790 A | 7/1996 | Henriksson |
| 5,662,793 A | 9/1997 | Beall, Jr. |
| 5,705,067 A | 1/1998 | Sumi et al. |
| 5,976,363 A | 11/1999 | Monroe et al. |
| 6,099,733 A | 8/2000 | Haney |
| 6,159,383 A * | 12/2000 | Gullett .................. F02M 37/14 123/509 |
| 6,244,474 B1 | 6/2001 | Loeffler |
| 6,253,960 B1 | 7/2001 | Bilskie et al. |
| 7,093,651 B2 | 8/2006 | Meyers et al. |
| 7,225,936 B2 | 6/2007 | Jersey et al. |
| 7,316,774 B2 | 1/2008 | Halemba et al. |
| 7,331,483 B2 | 2/2008 | Bhimani et al. |
| 7,387,210 B2 | 6/2008 | Burrows et al. |
| 7,472,805 B2 | 1/2009 | Nighy |
| 7,540,956 B1 | 6/2009 | Kurth et al. |
| 7,594,525 B2 | 9/2009 | Girard et al. |
| 7,651,070 B2 | 1/2010 | Ruprecht |
| 7,736,503 B2 * | 6/2010 | Kennedy ................ B01D 61/12 210/232 |
| 7,980,425 B2 | 7/2011 | Baron et al. |
| 7,992,667 B2 | 8/2011 | Rennie |
| 8,061,567 B2 | 11/2011 | Bevans et al. |
| 8,097,158 B2 | 1/2012 | Tubby et al. |
| 8,298,420 B2 | 10/2012 | Burrows |
| 8,327,607 B2 | 12/2012 | Nighy |
| 8,372,273 B2 | 2/2013 | Joo et al. |
| 8,561,841 B2 | 10/2013 | Erman et al. |
| 8,585,071 B2 | 11/2013 | Golden, Jr. |
| 8,800,820 B2 | 8/2014 | Girard et al. |
| 8,857,674 B2 | 10/2014 | Nighy et al. |
| 8,876,012 B2 | 11/2014 | McMurty |
| 8,881,958 B2 | 11/2014 | Hoonaard |
| 8,893,927 B2 | 11/2014 | Olson et al. |
| 8,911,623 B2 | 12/2014 | Tubby et al. |
| 8,945,383 B2 | 2/2015 | Sherman et al. |
| 8,951,415 B2 | 2/2015 | Sherman et al. |
| 9,044,699 B2 | 6/2015 | Gale et al. |
| D755,344 S | 5/2016 | Reckin et al. |
| D755,922 S | 5/2016 | Sherman et al. |
| 9,345,995 B2 | 5/2016 | Tubby et al. |
| 2003/0019764 A1 | 1/2003 | Baldwin et al. |
| 2003/0143092 A1 | 7/2003 | Hanson |
| 2005/0023198 A1 | 2/2005 | Halemba et al. |
| 2005/0045552 A1 | 3/2005 | Tadlock |
| 2005/0123408 A1 * | 6/2005 | Koehl ................ F04D 15/0088 417/53 |
| 2007/0045165 A1 | 3/2007 | Beall |
| 2008/0135501 A1 * | 6/2008 | Tadlock ............... B01D 35/303 210/767 |
| 2008/0149669 A1 | 6/2008 | Nicholson et al. |
| 2008/0283550 A1 | 11/2008 | Nighy et al. |
| 2009/0104336 A1 | 4/2009 | Fraij et al. |
| 2012/0031844 A1 | 2/2012 | St. Hilaire et al. |
| 2012/0102999 A1 | 5/2012 | Anselmino et al. |
| 2012/0272927 A1 | 11/2012 | Jonsson |
| 2012/0305605 A1 | 12/2012 | Vassaux et al. |
| 2013/0092282 A1 | 4/2013 | Nighy |
| 2013/0220905 A1 | 8/2013 | Waite et al. |
| 2013/0309099 A1 | 11/2013 | Irving et al. |
| 2014/0305316 A1 | 10/2014 | Sevcik et al. |
| 2015/0069088 A1 | 3/2015 | Olson et al. |
| 2015/0125578 A1 | 5/2015 | Hatherell |
| 2015/0137516 A1 | 5/2015 | Pangburn et al. |
| 2016/0017882 A1 | 1/2016 | Meza et al. |
| 2016/0025086 A1 | 1/2016 | Meza |

FOREIGN PATENT DOCUMENTS

| | | |
|---|---|---|
| CN | 1339657 A | 3/2002 |
| CN | 1836095 A | 9/2006 |
| CN | 202016907 U | 10/2011 |
| CN | 102249468 A | 11/2011 |
| CN | 102674628 A | 9/2012 |
| CN | 202430078 U | 9/2012 |
| CN | 203411407 U | 1/2014 |
| CN | 104358677 A | 2/2015 |
| EP | 1094027 A1 | 4/2001 |
| EP | 2294953 A | 3/2011 |
| GB | 2317653 | 4/1998 |
| JP | 4736060 | 11/1972 |
| JP | H08230993 A | 9/1996 |
| JP | 1119486 A | 1/1999 |
| JP | 2000065001 A | 3/2000 |
| JP | 2001101521 A | 4/2001 |
| JP | 2001179243 A | 7/2001 |
| JP | 2002136966 A | 5/2002 |
| JP | 2003094044 A | 4/2003 |
| JP | 2003331352 A | 11/2003 |
| JP | 3623076 B2 | 2/2005 |
| JP | 2014114813 A | 6/2014 |
| WO | 9851628 | 11/1998 |
| WO | 2008011676 | 1/2008 |
| WO | 2013043889 | 3/2013 |
| WO | 2014179394 | 11/2014 |

OTHER PUBLICATIONS

3M Water Filtration Products, Dual Flow Manifold Systems Instruction Manual for DF1XX and DF2XX High Flow Series manifolds and water filtration systems, 2012 (8 pages).

PurePro USA Reverse Osmosis RO Water Filters—Pump RO (2 pages), http://www.purepro.net/booster_pump_ro.html (printed out May 28, 2015).

Spring 100GPD 7-Stage Reverse Osmosis RO UV Alkaline Water Filter System with Booster Pump: Amazon.co.uk: DIY & Tools (7 pages), http://www.amazon.co.uk/iSpring-7-stage-reverse-osmosis-alkaline/dp/B006X3YJKK.html (printed out May 28, 2015).

Easywell Water Systems, Inc., Reverse osmosis filtration systems, 5 Stages Manifold R.O. System with Booster Pump(2 pages), (56) References Cited

OTHER PUBLICATIONS http://www.easywellwater.com/products/products_show.php?pid=10.html (printed out May 28, 2015).

Easywell Water Systems, Inc., 6 Stage R.O. System with Booster Pump Reverse Osmosis (2 pages), http://www.taiwantrade.com.tw/EP/easywell/products-detail/en_US/738144/6_stage_R.O._system_with_booster_pump_reverse_osmosis/.html (printed out May 28, 2015).

Bladder-Type Accumulators, Tobul Accumulator, Inc., tobul.com, https://web.archive.org/web/20090310232349/http://www.tobul.com/index.php?option=com_content&task=view&id=25&Itemid=51, Mar. 10, 2009.

Johnson Pump Accumulator Tank, Bay Marine Supply, baymarinesupply.com, http://baymarinesupply.com/store/johnson-pump-accumulator-tank.html, printed on Sep. 15, 2015.

Groco, Accumulator Tank, Go2Marine, go2marine.com, https://web.archive.org/web/20140724184740/http://www.go2marine.com/product/204656F/groco-accumulator-tank.html, Jul. 24, 2014.

Shurflo® Mini Water Boost System Pentair, foodservice.pentair.com, http://foodservice.pentair.com/~/media/pentair/food-service/flles/products/shurflo-water-boost/mini-water-boost-system-60-psi-804-001/804-001-Mini-Water-Boostpdf.pdf, Mar. 27, 2014.

Accumulator Tanks, SHURFlo®, legacy.shurflo.com, http://legacy.shurflo.com/pages/Food_Service/beverage/accumulator_tanks/tanks.html, printed on Sep. 15, 2015.

Accumulator Tank, Jabsco, j109.org, xylem, Model 30573-0000, https://j109.org/docs/absco_accumulator_30573-0000.pdf, Oct. 2012.

Amtrol® RO 4 Reverse Osmosis Replacement Accumulator Water Tank, Water Filters Online, waterfiltersonline.com, https://web.archive.org/web/20030312172129/http://www.waterfiltersonline.com/detail.asp?product_id=Amtrol_RO_4, Mar. 12, 2003.

Whale Accumulator Pump and 8ltr Tank Kit, Whale® Marine, whalepumps.com, http://www.whalepumps.com/marine/siteFiles/resources/docs/resource-library/datasheets/PumpAccumulatorKitDatasheet.pdf, Aug. 26, 2014.

Japanese Office Action and English Translation, Application No. 2017-560995, dated Mar. 3, 2020, 9 pages.

Japanese Office Action and English Translation, Application No. 2018-513477, dated Oct. 6, 2020, 11 pages.

Chinese Notice of Allowance, Application No. 201680030215.5, dated Nov. 5, 2020, 4 pages.

Franklin Electric, "Inline 400 Pressure Boosting System" (4 pages).

\* cited by examiner

FIG. 2B: Beverage Application

FIG. 2C: RO Application

1 or #6, Motor Pump Cartridge Unit

9, Cartridge housing

9a, Motor pump mounting matching the filter cartridge mounting

9b, Motor pump porting matching filter cartridge porting #5

9c, Motor pump unit

9c1, Pump head

9c2, Motor

9c3, Electronic control module (optional)

*FIG. 2D*: Motor Pump Unit Cartridge

CARTRIDGE PUMP

CROSS-REFERENCE TO RELATED APPLICATIONS

This application claims benefit to provisional patent application serial nos. 62/166,988, filed 27 May 2015, which is incorporated by reference in their entirety.

BACKGROUND OF THE INVENTION

1. Field of Invention

The present invention relates to a pump; and more particularly relates to a cartridge pump.

2. Description of Related Art

Figure 1:
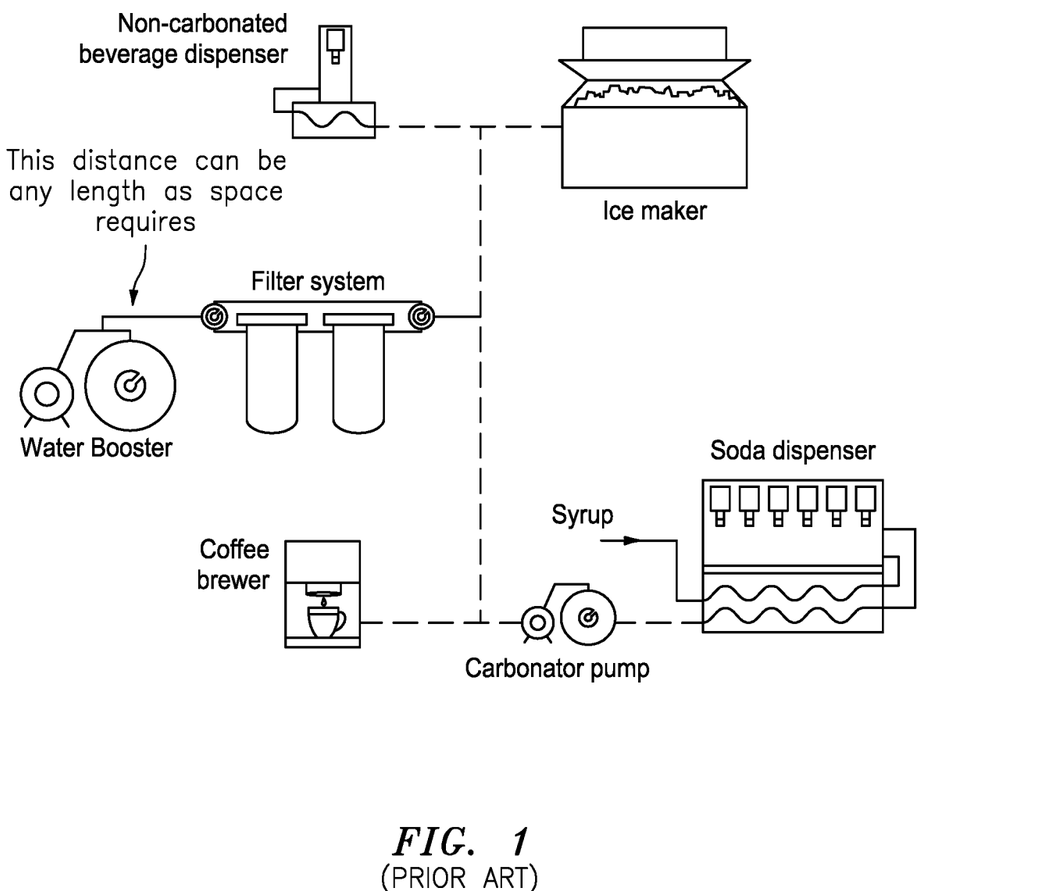
FIG. 1 shows a diagram of an installation of a booster system having a pump and an accumulator mounted separately from filters that is known in the art.

FIG. 1 shows an installation that is known in the art, e.g., including a non-carbonated beverage dispenser, a soda dispenser, a coffee brewer that are arranged and coupled in relation to an ice maker, a combination of a water supply, a booster and a filter system and a carbonator pump. In the installation, the distance between the water booster and the filter system can be any length as space requires.

In operation, booster systems in the beverage market are designed to provide a water supply at a constant pressure, to carbonators, ice makers, non-carbonated drink dispensing valves, coffee/tea brewers, etc. In FIG. 1, the typical booster system has the pump and the accumulator tank connected to the filter system that then distributes the water to the aforementioned devices. The current installation requires the pump and accumulator tank to be mounted separately from the filters or filtering system.

Figure 5A:
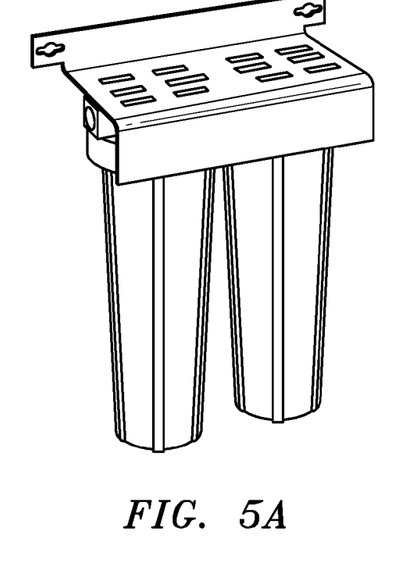
FIG. 5 includes FIGS. 5A through 5C, which show diagrams of mounting brackets and cartridges system that are known in the art.
Figure 5B:
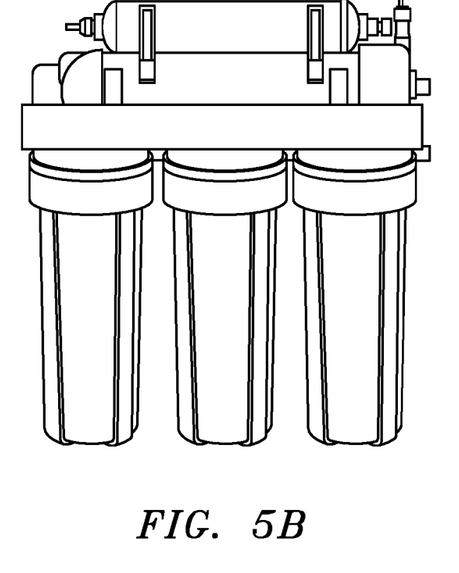
Figure 5C:
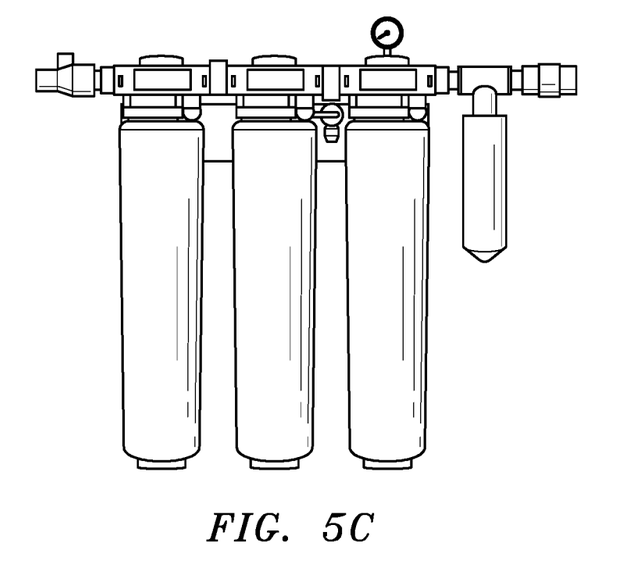

Some of the shortcomings of the above mentioned installation and devices include the following:

Currently, the booster systems are separately mounted from the filtering system through a series of multiple connections and hoses, see FIG. 1. In effect, this means running tubing and manually plumbing the units in place. Each of these connections is a potential leak path for the overall system and any length of hose is prone to snagging, kinking, or rupture. FIG. 4 shows a few of the many systems that are currently in the market for boosting water pressure, e.g., in FIGS. 4A through 4D. They are costly, bulky, and usually consist of many components. Repair and maintenance are complicated and often the entire unit must be replaced. See FIGS. 4 and 5 that show current configurations of pumps and filters, e.g., including FIGS. 5A through 5D.

SUMMARY OF THE INVENTION

In summary, the present invention may consistent of a cartridge style pump that may be plumbed directly into a filter manifold. The pump can be an intelligent pump that would remove the need for an accumulator tank from the system. The connection would allow for direct porting and reduce line loss, and the requirement to remotely mount and plumb the boost system, as well as reduce potential leak paths.

Examples of Particular Embodiments

According to some embodiments, and by way of example, the present invention may include, or take the form of, a system, that features a new and unique pump cartridge, a filter cartridge and an inline mounting bracket combination.

The pump cartridge may include a cartridge housing configured with a motor pump unit arranged therein for pumping a fluid in the system, the pump cartridge configured with a pump cartridge mounting, and with a pump cartridge porting to receive the fluid and provide pumped fluid.

The filter cartridge may be configured to receive and filter the pumped fluid and provide filtered pumped fluid, the filter cartridge configured with a filter cartridge mounting and with filter cartridge porting to receive the pumped fluid and provide filtered pumped fluid, the pump cartridge mounting and the filter cartridge mounting being configured to substantially match; the pump cartridge porting and the filter cartridge porting also being configured to substantially match.

The inline mounting bracket may include inline cartridge mounting units and inline mounting bracket ports arranged inbetween for providing associated fluid from one inline cartridge mounting unit to an adjacent inline cartridge mounting unit. Each of the inline cartridge mounting units may be configured to mount either the pump cartridge or the filter cartridge. One inline cartridge mounting unit may be configured to receive the pump cartridge mounting so that the pump cartridge porting aligns with a set of the inline mounting bracket ports. Another inline cartridge mounting unit configured to receive the filter cartridge mounting so that the filter cartridge porting aligns with a corresponding set of the inline mounting bracket ports.

By way of example, the system may include one or more of the following features:

The pump cartridge may include a smart pump having an electronic controller configured therein so that the pump cartridge provides the pumped liquid with a predetermined pumping functionality, including a constant flow and pressure.

The controller may be configured with a variable speed control to adjust the speed in response to a change in the pump head pressure in order to maintain the constant flow and pressure.

The controller may be configured to respond to a pressure signal containing information about the pressure of the pumped liquid.

The system may include an accumulator configured to receive and accumulate the fluid pumped by the pump cartridge.

The system may form part of a beverage dispensing system, or a reverse osmosis system, a water filtration system.

At least one inline cartridge mounting unit may be configured to receive the pump cartridge mounting, which is rotated therein so that the pump cartridge porting aligns with the set of corresponding inline mounting bracket ports.

At least one inline cartridge mounting unit may be configured to receive the filter cartridge mounting, which is rotated so that the filter cartridge porting aligns with the set of corresponding inline mounting bracket ports.

Solution to Problem in the Art

The present invention overcomes the above mentioned difficulties as follows:

By way of example, the present invention may be utilized in many different applications such as reverse osmosis (RO), water filtration, residential areas where low water pressure is an issue etc.

BRIEF DESCRIPTION OF THE DRAWING

The drawing includes FIGS. 1-5C, which are not necessarily drawn to scale, which are briefly described as follows.

Not every element or arrow in every Figure is labeled with a lead line and reference numeral/label, so as to reduce clutter in the drawing.

DETAILED DESCRIPTION OF BEST MODE OF THE INVENTION

Detailed Description of the Operation of the Present Invention

In summary, the present invention may take the form of, or consist of, one or more pump cartridge, which are directly connected in-line with one or more filter cartridges. They may be paired with an accumulator tank for a pump version, and with no accumulator tank for a smart pump version. The inline mounting bracket design reduces the size of the system, the amount of connections, and the amount of hose required to install the system, which in turn reduces the space required for installation, the number of potential leak paths, and the likelihood of failure of the system due to issues with the hose. The reader is referred collectively to the embodiments shown in FIGS. 2A through 3.

Figure 2A:
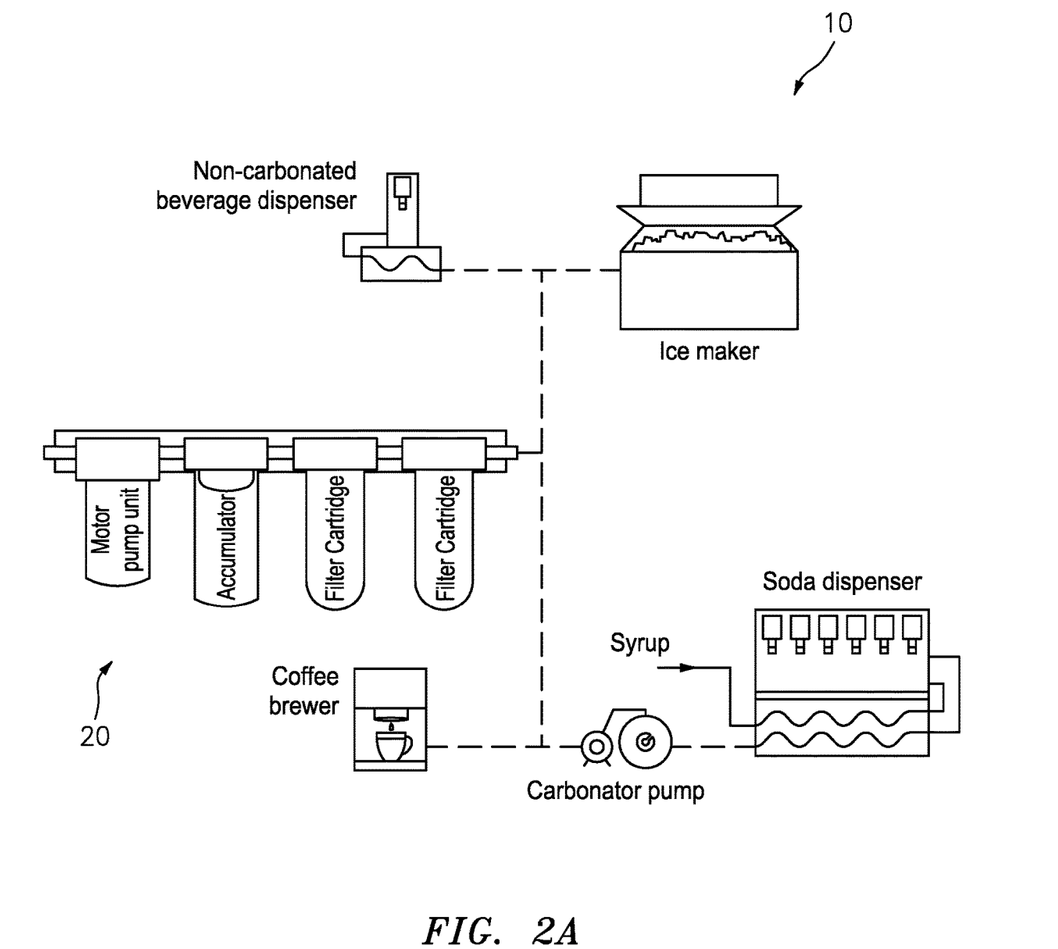
FIG. 2A shows a system having a combination of a motor pump unit/cartridge, an accumulator cartridge and two filter cartridges configured in relation to an inline mounting bracket, according to the present invention.
Figure 2B:
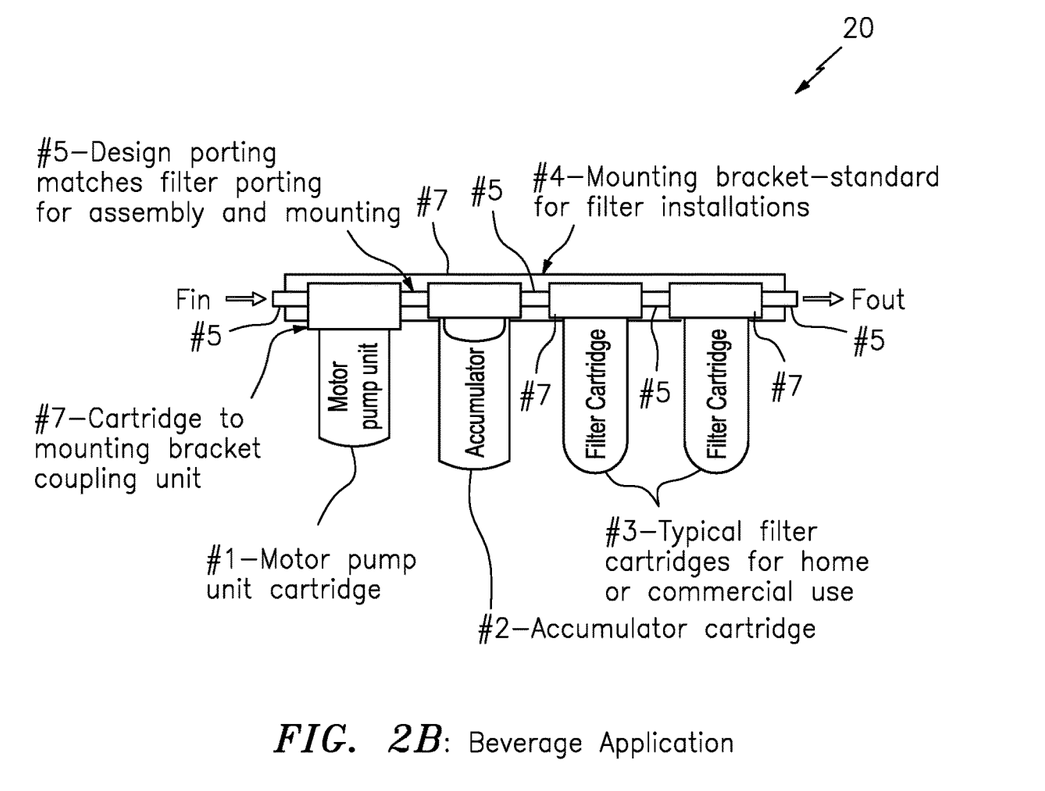
FIG. 2B shows the combination of the motor pump unit/cartridge, the accumulator cartridge and the two filter cartridges configured in relation to the inline mounting bracket for implementing in a beverage application like that shown in FIG. 2A, according to the present invention.

FIGS. 2A and 2B: Beverage Applications

Consistent with that set forth above, FIG. 1 show an overall view of the current known system, and FIG. 2A show an overall view of a system generally indicated as 10 according to the present invention. In the current system shown in FIG. 1, the booster system is mounted separately from the filtration system. In contrast, the system 10 according to the present invention shown in FIG. 2A includes a combination generally indicated as 20 of cartridges for the pump, the accumulator tank, and the filter unit(s), which may be installed inline allowing for easier installation, maintenance, repair, and cartridge replacement.

Figure 2C:
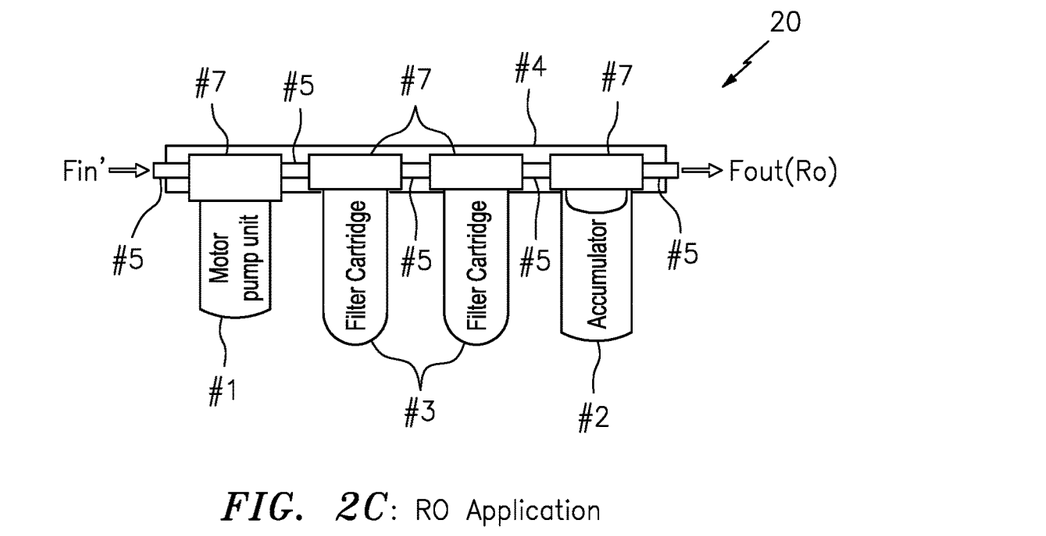
FIG. 2C shows a combination of a motor pump unit/cartridge, two filter cartridges and an accumulator cartridge configured in relation to an inline mounting bracket, for implementing in a reverse osmosis (RO) application, according to the present invention.

FIGS. 2A, 2B and 2C show systems 20, 20' that may include the following:

1) Pump cartridge (aka the motor pump unit cartridge) that may be configured or designed as a modular pump system arranged or contain in a standard cartridge housing, e.g., like that used for a filter cartridge. By way of example, the motor pump unit cartridge (#1) may be configured with porting, e.g., including input and output ports, that can be directly connected to corresponding ports in the filter systems in which it is implemented. By way of example, this motor pump unit cartridge (#1) may utilize a quick connect pump head that is known in the art and easily serviced. By way of example, see FIG. 2D, the pump head (#9c1) that forms part of the motor pump unit (#9c) arranged or contained in the cartridge housing (#9).

2) Accumulator cartridge (#2) that may be configured as, or would consist of, an accumulator tank designed to fit into the filter configuration of the filter systems in which it is implemented. By way of example, in an RO system 20' like that shown in FIG. 2C, the accumulator tank (#2) may be after the filters (#3) as shown in FIG. 2C.

3) Typical filter cartridges that are known in the art, and available on the market. In effect, the scope of the invention is not intended to be limited to any particular type or kind of filter cartridge either now known or later developed in the future. Examples of the filter cartridge are disclosed in FIG. 5 below, as well as the U.S. patent documents, and other references set forth below.

4) Typical mounting brackets that are known in the art, and available on the market. In effect, the scope of the invention is not intended to be limited to any particular type or kind of mounting bracket either now known or later developed in the future. Examples of other mounting brackets are also disclosed in the U.S. patent documents, and other references set forth below.

5) Porting that is configured for fluidicly coupling or connecting the pump cartridge (#1), the accumulator (#2) and the filter cartridge (#3) units together mounted in the mounting bracket (#4) that are known in the art. By way of example, such porting (#5) may form an integrate part of the mounting bracket (#4), including those currently available on the market.

FIGS. 2B and 2C shows combinations 20 and 20' of typical installations, e.g. using the pump and accumulator cartridges mounted in-line with one or more cartridges for the filter(s) for receiving and processing input fluid $F_{in}$ and providing an output fluid $F_{out}$, $F_{out(RO)}$. In FIG. 2B, the combination includes a motor pump unit/cartridge (#1), an accumulator cartridge (#2) and one or more filter cartridges (#3), all configured in series and mounted on the inline mounting bracket (#4) for implementing in a beverage application like that shown in FIG. 2A. In FIG. 2C, the combination 20' includes the motor pump unit/cartridge (#1), the one or more filter cartridges (#3) and the accumulator cartridge (#2), all configured in series and mounted on the inline mounting bracket (#4) for implementing in a reverse osmosis (RO) application like that shown in FIG. 2C.

In FIGS. 2A, 2B and 2C, the one or more filter cartridges (#3) may include typical filter cartridges for home or commercial use. The inline mounting bracket (#4) may include, or take the form of, a standard or known mounting bracket for filter installations. The inline mounting bracket (#4) may include the design porting (#5) coupling the motor pump unit/cartridge (#1) and the accumulator cartridge (#2) that matches a filter porting used for assembly and mounting.

Figure 2D:
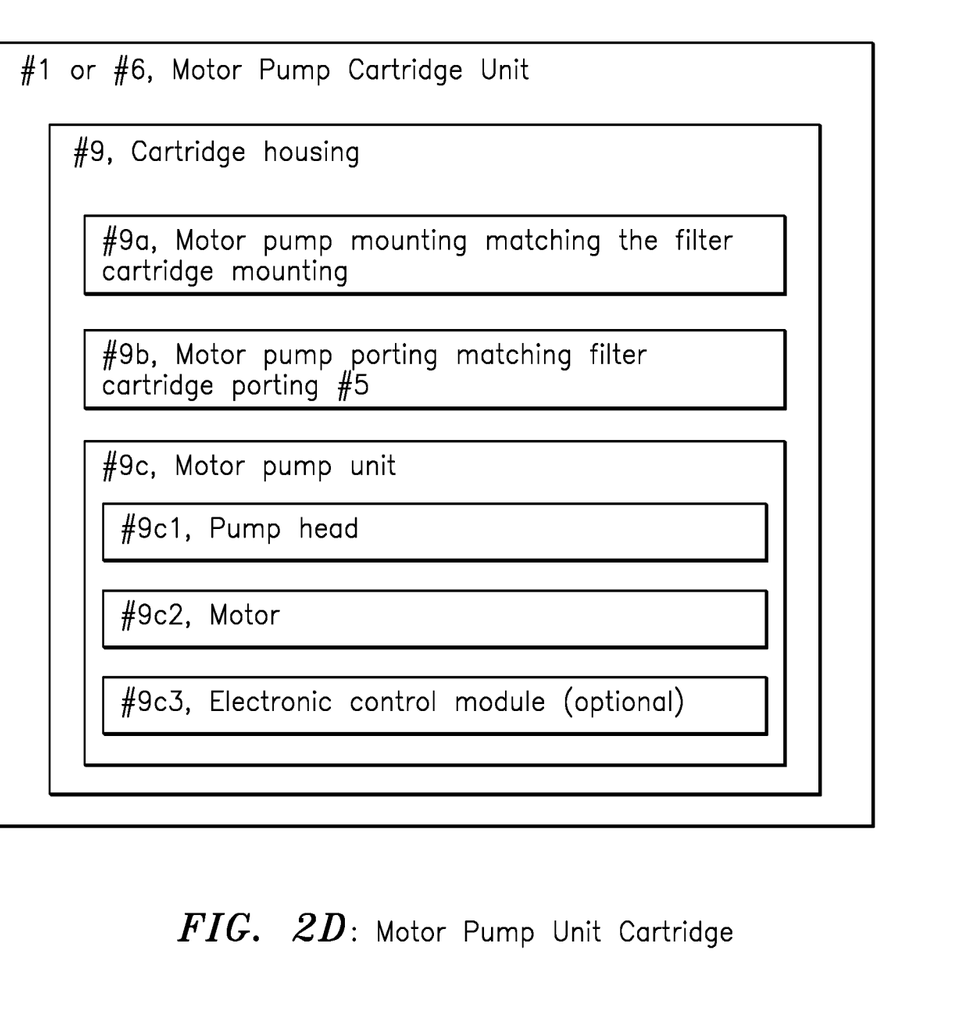
FIG. 2D shows a motor pump unit cartridge having cartridge mountings for matching a filter cartridge mounting, porting for matching filter cartridge porting, and also having a motor pump unit, according to some embodiments of the present invention.

FIG. 2D shows the motor pump unit cartridge (#1) or (#6) that may be configured to include a cartridge housing (#9) having a motor pump mounting (#9a) that matches the filter cartridge mounting, and a motor pump porting (#9b) that matches the filter cartridge porting (#5) and a motor pump unit (#9c). By way of example, the motor pump unit (#9c) may include a pump head (#9c1) that has input/output porting to fit directly in line with, and couple to, the cartridge's porting (#9a) for matching and aligning with the design/filter porting (#5) of the existing filter cartridges like the one or more filter cartridges (#3). The motor pump unit (#9c) also includes a motor (#9c2) for driving the pump head (#9c1). The motor (#9c2) may also include a quick connect to allow for easier pump replacement as needed. It is important to note that the scope of the invention in not intended to be limited to any particular type or kind of motor and/or pump combination; and embodiment are envisioned, and the scope of the invention is intended to include, using a motor and/or pump combination that are now known or later developed in the future. By way of example, the motor and/or pump combination may include, or take the form of a motor and/or pump combination for implementing a diaphragm pumping arrangement, as well as other types or kind of pumping arrangement. The whole thrust of the present invention is to configured such a motor and/or pump combination in a standard cartridge like the cartridge housings used for the accumulator, the filter, etc., and to couple the motor and/or pump combination in the standard cartridge into the inline mounting bracket (#4), e.g., by using a standard cartridge mounting used for coupling the filter cartridge (#3) to the mounting bracket (#4), as well as a standard design porting (#5) for coupling the motor pump unit/cartridge (#1), the filter cartridge (#3) and the accumulator cartridge (#2) fluidically together that matches the design/filter porting (#5) currently used for assembly and mounting.

By way of example, the following U.S. patent applications disclosure different types or kinds of pump technologies that may be suitably adapted, arranged or implemented, e.g., in a cartridge housing like element (#9) in FIG. 2D. See patent application Ser. Nos. 14/794,284; 14/740,577 and 13/895,719, which are all incorporated by reference in their entirety. It is understood, and one skilled in the art would appreciate, that other U.S. patent applications may disclose other types or kinds of pump technologies that may be suitably adapted, arranged or implemented, e.g., in a cartridge housing like element (#9) in FIG. 2D, within the spirit of the underlying invention.

Figure 2E:
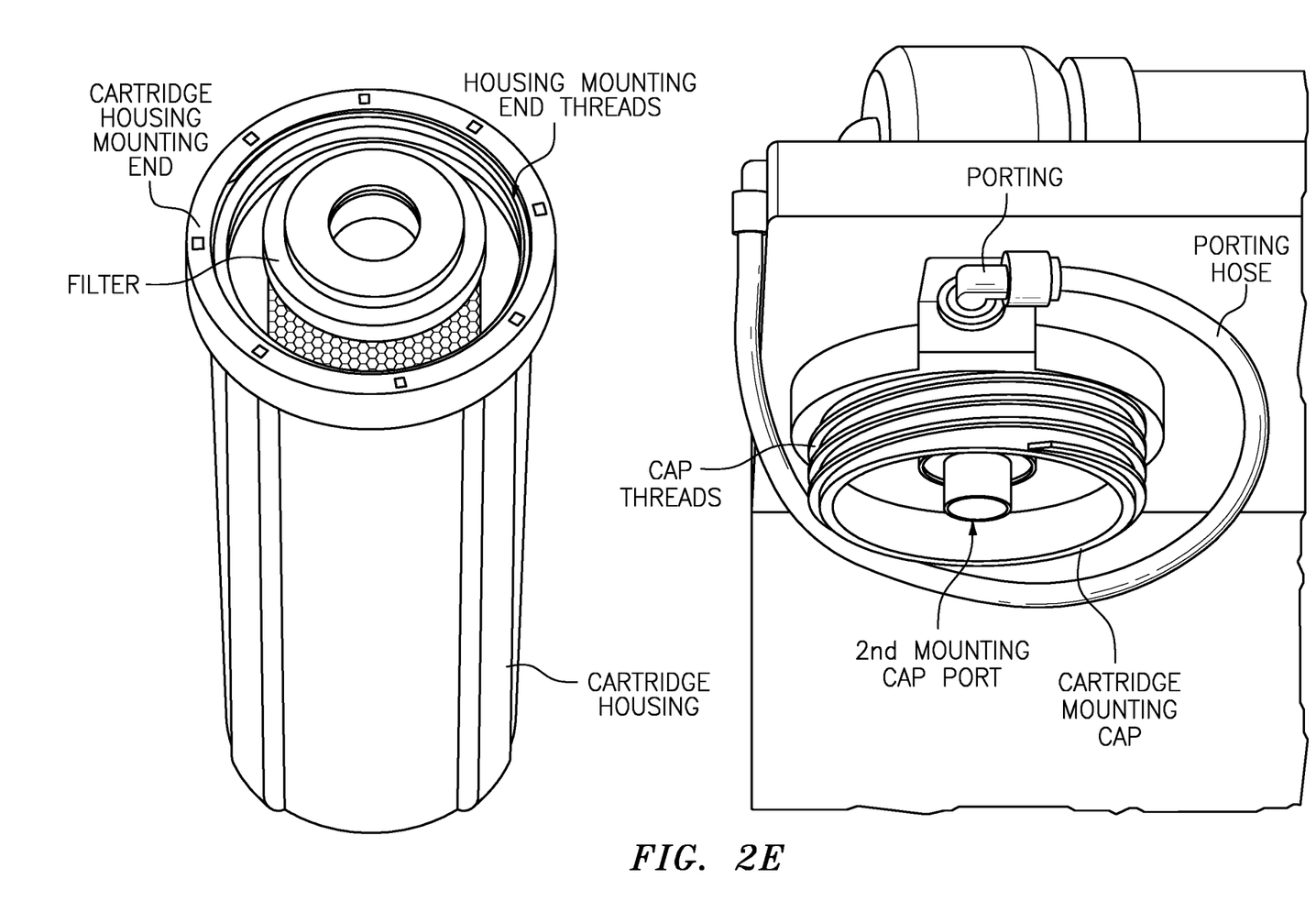
FIG. 2E is a photograph of a filter cartridge that is disassembled and has a cartridge housing and a cartridge mounting cap, according to some embodiments of the invention.
Figure 2F:
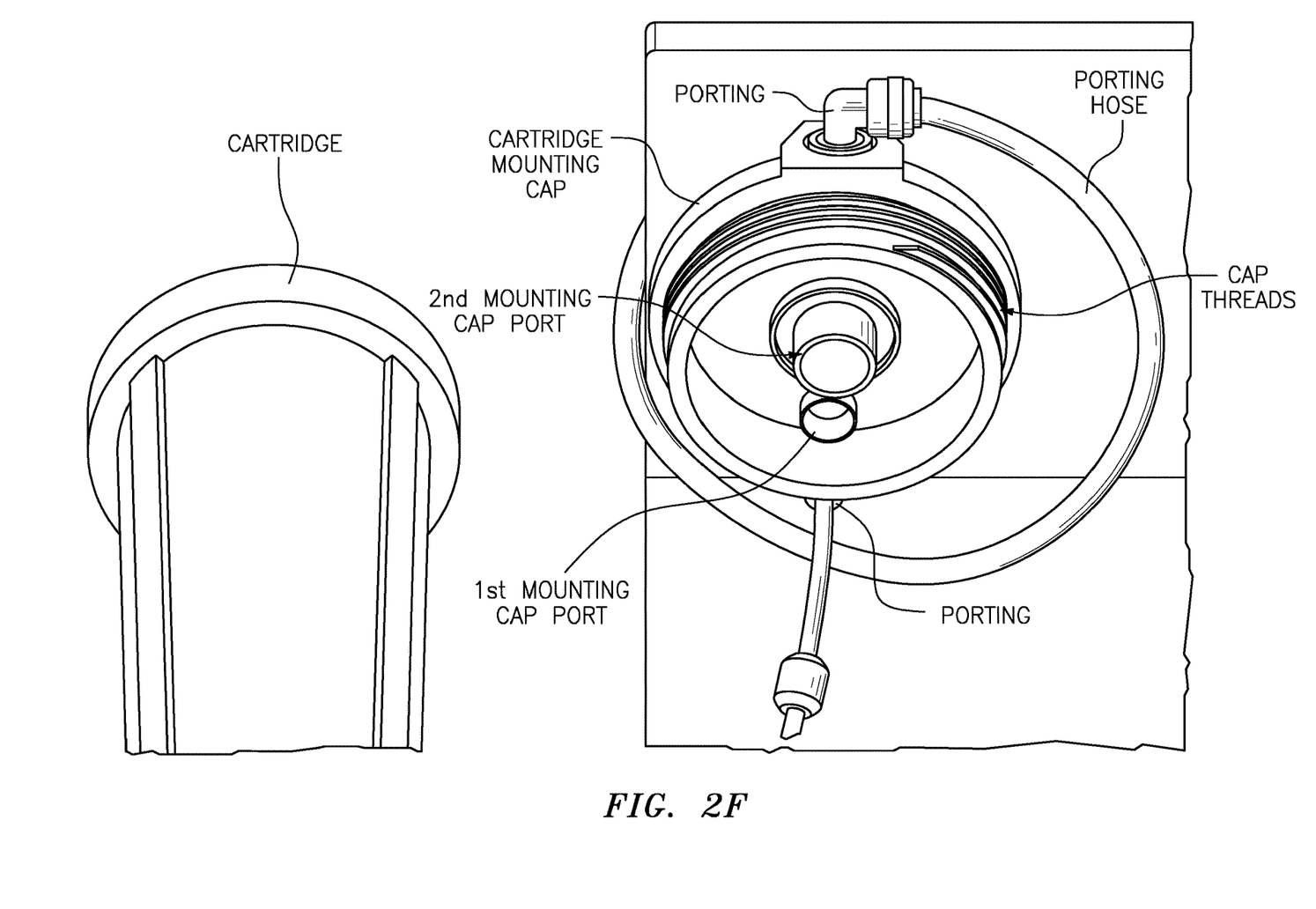
FIG. 2F is a photograph of a bottom enlarged view of the cartridge mounting cap in FIG. 2E, showing 1st and 2nd mounting cap ports, according to some embodiments of the invention.

FIG. 2E shows a filter cartridge that is disassembled and has a cartridge housing and a cartridge mounting cap; and FIG. 2F shows the cartridge mounting cap in FIG. 2E, having 1st and 2nd mounting cap ports. In FIG. 2E, the housing cartridge has a filter arranged therein. The cartridge has a cartridge housing mounting end configured with housing mounting end threads, as best shown in FIG. 2F. The cartridge mounting cap has cap threads, as shown in FIGS. 2E and 2F for coupling with the housing mounting end threads of the cartridge when the cartridge housing and the cartridge mounting cap are assembled or screwed together. The cartridge mounting cap has two portings coupled thereto. One porting maybe fluidicly coupled to the 1st mounting cap port, and the other porting maybe fluidicly coupled to the 2nd mounting cap port, as shown. The portings are also shown coupled to porting hosing for providing fluids to and from the portings and the cartridge assembly.

By way of example, and according to some embodiments of the present invention, the motor pump unit may be configured into the cartridge housing and its input/output pump porting suitably adapted or coupled to the 1st and 2nd mounting cap ports in order to implement the integration of such a motor pump unit into the inline pumping assembly and provide the inline pumping of fluid in the overall assembly, according to the present invention.

Figure 3:
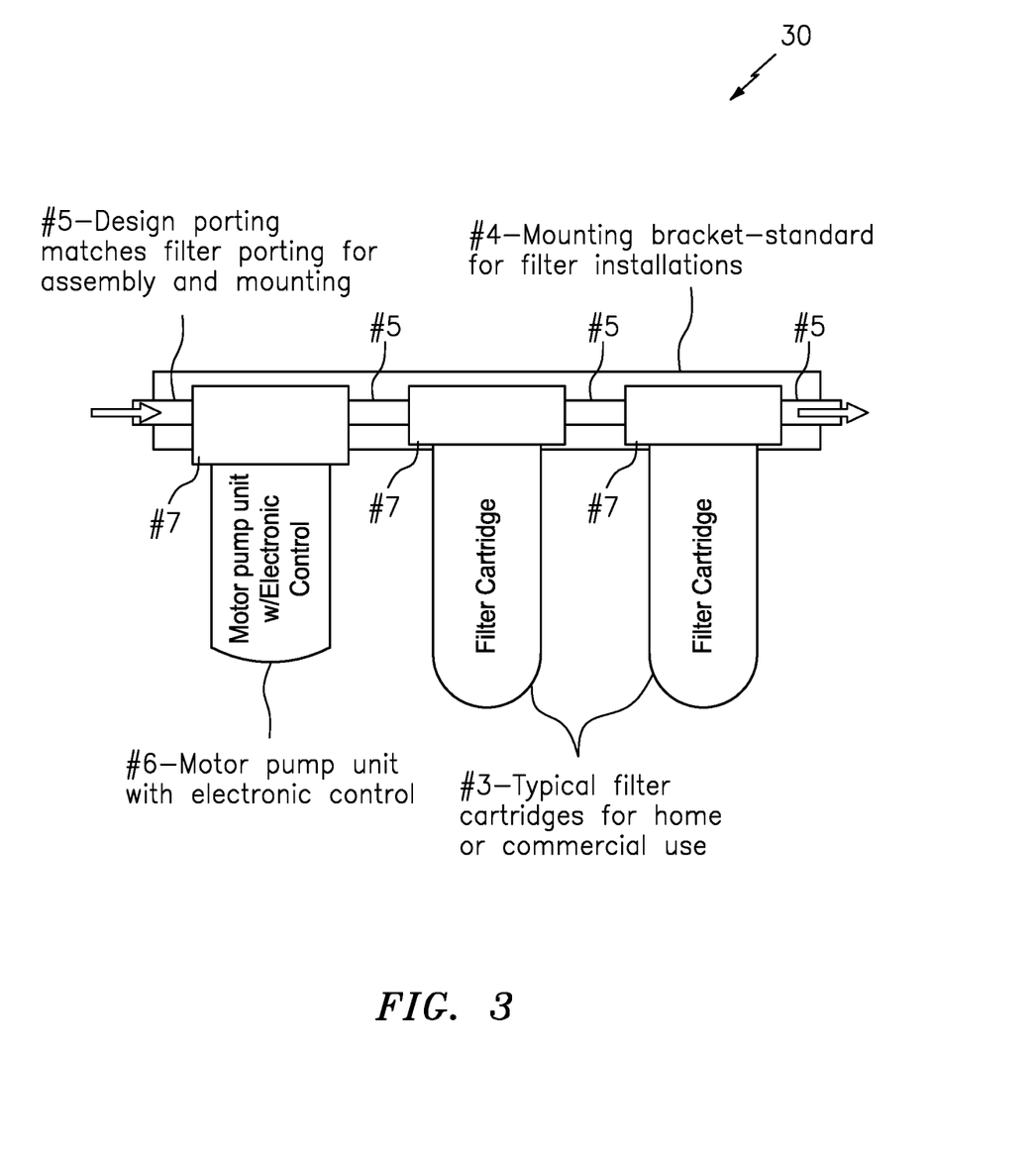
FIG. 3 shows a combination of a motor pump unit/cartridge, having an electronic/intelligent controller, and two filter cartridges configured in relation to the inline mounting bracket, according to the present invention.
Figure 4A:
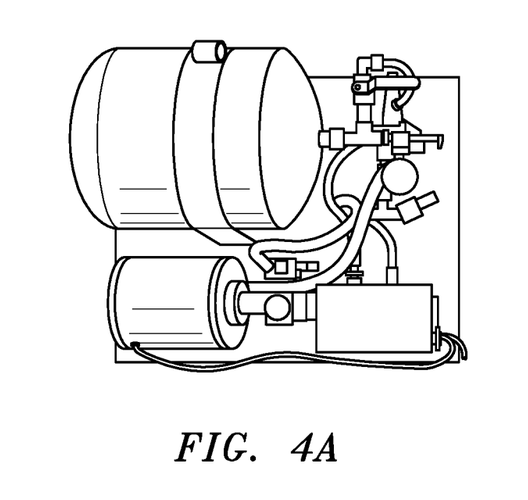
FIG. 4 includes FIGS. 4A through 4D, which show diagrams of booster system that are known in the art.
Figure 4B:
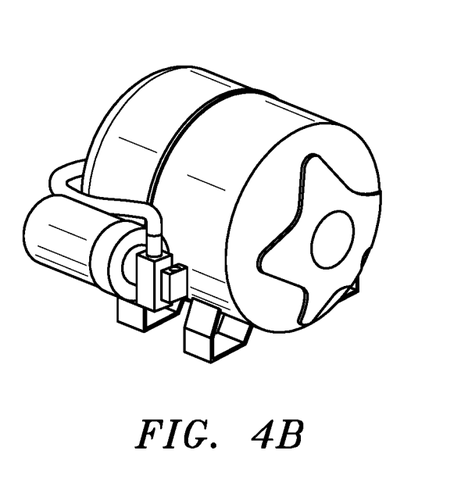
Figure 4C:
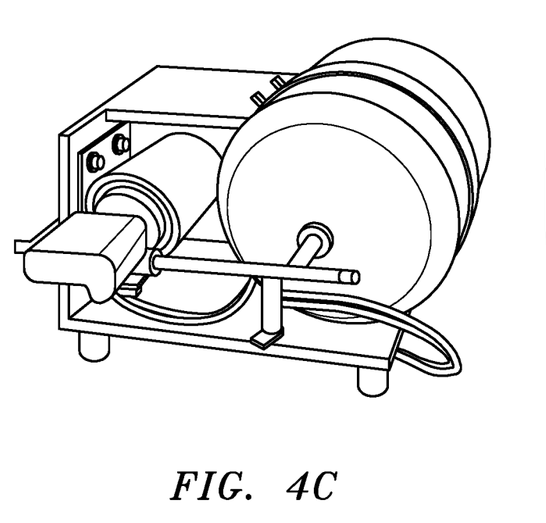
Figure 4D:
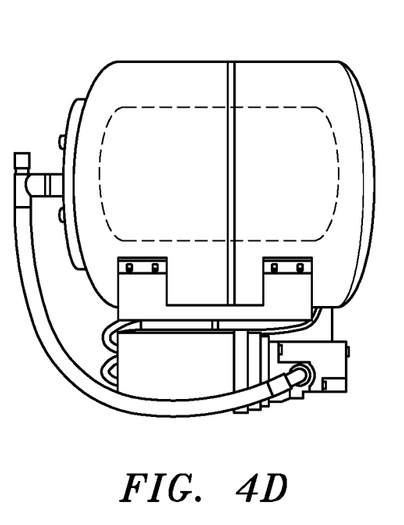

FIG. 3: Pump Cartridge with Electronic Controls

FIG. 3 shows a combination generally indicated as 30 that represents a similar concept, but rather than using an accumulator tank, the system 30 utilizes a motor pump unit generally indicated as (#6) with an intelligent controller, e.g., like electronic control module (#9c3) in FIG. 2D. This feature will consist of a combination of a pump head, a motor and a controller, e.g., to provide constant flow and pressure to the system 30 among other pump control functionalities.

In effect, the pump cartridge (#6) with electronic control or controller (#9c3) may be configured to include, or consist of, the pump cartridge (#1) that also includes a controller module like element (#1c) in FIG. 2D that may be configured to implement one or more pump control algorithms to perform or provide pump control functionality, e.g., consistent with that set forth below:

In close proximity, the pump cartridge (#6) with electronic controller (#9c3) may be configured to provide immediate response to system conditions.

By way of example, the system 30 may be configured to utilize pre-triggering to prevent instantaneous pressure drops, e.g., when valves are opened to dispense fluids. In this case, and by way of example, the pump cartridge (#6) with electronic controller (#9c3) may be configured to receive sensed signaling containing information, e.g., about instantaneous pressure drops, when valves are opened to dispense fluids, etc., and also configured to implement one or more suitable pump control algorithms to perform suitable pump control functionality to respond to the same.

By way of further example, the system 30 may be configured to utilize variable speed control to ensure that the flow and/or pressure remain constant to the need. As an example, a beverage dispense valve typically requires 40 PSI to be supplied to the valve at a flow rate of 2.5 ounces per second, with one valve open the pump may only require 25% of the power to meet that need. A typical pump without intelligence that is known in the art will still try to run at full speed using more energy and providing inconsistent flow as more valves are opened. In this case, and by way of example, the pump cartridge (#6) with electronic controller (#9c3) may be configured to receive sensed signaling containing information about speed, flow and/or pressure, etc., and also configured to implement one or more suitable pump control algorithms to perform suitable pump control functionality to respond to the same.

This system 30 may be configured to only use the power needed to provide the flow and pressure, e.g., by implementing suitable control or controller algorithms that forms part of the overall pump electronic control intelligence. In case where more valves may be open at the same time, the pump electronic control or controller may be configured to increase power as needed to maintain the required flow and pressure. Moreover, the pump pressure may be sensed using a pressure switch, transducer or other means of sensing pressure. The pump cartridge's electronic control or controller may be configured to monitor the pump and detect various operations such as, but not limited to, run dry, over current, over voltage, under voltage, etc., e.g., and implement suitable pump protection algorithms to protect the pump. By way of example, the pump protection algorithms may include, or take the form of, shutting the pump off, providing a suitable audio or visual warning, restarting the pump after a predetermined time increment, cycling the pump on/off, etc. In this case, and by way of example, the pump cartridge (#6) with electronic controller (#9c3) may be configured to receive sensed signaling containing information about power, voltage, current, speed, flow, valve openings, and/or pressure, etc., and also configured to implement one or more suitable pump control algorithms to perform suitable pump control functionality to respond to the same.

The system 30 may also be configured to utilize communications to alert the user of required maintenance or repair. This embodiment would eliminate the need for an accumulator tank as it would be on demand. In this case, and by way of example, the pump cartridge (#6) with electronic controller (#9c3) may be configured to receive sensed signaling containing information about maintenance, repair and/or alerts, etc., and also configured to implement one or more suitable pump control algorithms to perform suitable pump control functionality to respond to the same.

By way of example, the pump cartridge (#1) may include, or consists of, a pump head (#9c1) that has porting to fit directly in line with the existing filter cartridges like element (#3), a motor (#9c2) for driving the pump head (#9c1), and an intelligent electronic controller like element (#9c1) with the features listed above. The motor (#9c2) can also include a quick connect to allow for easier pump replacement as needed. Pump heads and motors are known in the art, and the scope of the invention is not intended to be limited to any particular type or kind thereof. By way of example, different types of pumps are known to have different types of pump heads, and different types of pumps are known to have different types of motors. One skilled in the art would appreciate and understand, without undue experimentation, how to implement a particular type of pump having a particular type of pump head in combination with a particular type of motor, without undue experimentation, for a particular type of application. By way of example, for a beverage application, one skilled in the art would appreciate and understand, without undue experimentation, how to implement one type of pump having one type of pump head in combination with one type of motor, without undue experimentation. Alternatively, and by way of further example, for a reverse osmosis application, one skilled in the art would appreciate and understand, without undue experimentation, how to implement another type of pump having another type of pump head in combination with another type of motor, without undue experimentation. Embodiments are envisioned, and the scope of the invention is intended to include, using the same type of pump having the same type of pump head in combination with the same type of motor, etc. In other words, the scope of the invention is not intended to be limited to the type of pump, the type of pump head, or type of motor used for any particular type of application.

Furthermore, one skilled in the art would appreciate and understand, without undue experimentation, how to implement one or more pump control algorithms to perform or provide the aforementioned pump control functionality, e.g., by using known microprocessor technology and suitable control algorithms and flowcharts.

Signal Processor or Processing Module

By way of example, a signal processor or processing module may be configured at least to:
receive signaling containing information about suitable sensed signaling; and
determine corresponding signaling containing information to implement predetermined or desired pump control functionality, based upon the sensed signaling received.

In operation, the signal processor or processing module may be configured to provide the corresponding signaling to control the system 30, e.g., to control the motor/pumping functionality.

By way of example, the signal processor or processing module may be configured in, or form part of, the electronic control or controller module.

By way of example, the functionality of the signal processor or processing module may be implemented using hardware, software, firmware, or a combination thereof. In a typical software implementation, the signal processor or processing module would include one or more microprocessor-based architectures having, e.g., at least one signal processor or microprocessor like element. One skilled in the art would be able to program with suitable program code such a microcontroller-based, or microprocessor-based, implementation to perform the functionality described herein without undue experimentation. For example, the signal processor or processing module may be configured, e.g., by one skilled in the art without undue experimentation, to receive the signaling containing information about the suitable sensed signaling for further processing, consistent with that disclosed herein.

Moreover, the signal processor or processing module may be configured, e.g., by one skilled in the art without undue experimentation, to determine the corresponding signaling containing information to implement the predetermined or desired pump control functionality, based upon the sensed signaling received, consistent with that disclosed herein.

The scope of the invention is not intended to be limited to any particular implementation using technology either now known or later developed in the future. The scope of the invention is intended to include implementing the functionality of the processors as stand-alone processor, signal processor, or signal processor module, as well as separate processor or processor modules, as well as some combination thereof.

The system may also include, e.g., other signal processor circuits or components, including random access memory or memory module (RAM) and/or read only memory (ROM), input/output devices and control, and data and address buses connecting the same, and/or at least one input processor and at least one output processor, e.g., which would be appreciate by a person skilled in the art.

Possible Applications

Possible Applications may include one or more of the following: Beverage boost systems, or home booster/filters.

By way of example, and for the sake of understanding that disclosed herein, the present invention is described in relation to the beverage market and installation of such a system.

By way of example, this disclosure also shows using only two filters mounted, but there can be as many as needed, as a one skilled in the art would appreciate.

Other Filter Cartridge and Manifold Technology

In addition to the booster systems, mounting brackets and cartridges shown in FIG. 4-5 herein, the following are other filter cartridge and manifold technology that are known in the art and provided by way of further example.

For example, the reader is also referred to U.S. Pat. No. 7,387,210, as well as the following other U.S. Pat. Nos. 7,651,070; 7,992,667; 8,097,158; 8,298,420; 8,372,273; 8,585,071; 8,911,623; 8,945,383; 8,951,415; 9,044,699; 9,345,995, which are all incorporated by reference in their entirety.

See also U.S. Pat. Nos. 7,225,936, D755,344; and D755,922, which are also all incorporated by reference in their entirety.

For the sake of completeness, all of the references cited in section (56) of all the aforementioned U.S. patents are also all incorporated by reference in their entirety.

See also a Beverage Master Parts List, issued 9 Mar. 2012, by Manitowoc®, doing business at 21 Future Dr., Sellersburg, Ind. 47172; as well as a Dual Flow Manifold Systems Instruction Manual for DF1XX and DF2XX high flow series manifolds and water filtration systems, copyright in 2012, by 3M Purification, Inc. doing business at 400 Research Parkway, Meriden, Conn. 06450, which are also both incorporated by reference in their entirety.

A prior art search was also conducted, and the following U.S. patents or U.S. patent publications were developed therein: U.S. Pat. Nos. 8,893,927; 8,881,958; 8,857,674; 8,800,820; 8,561,841; 8,327,607; 8,061,567; 7,980,425; 7,594,525; 7,472,805; 7,331,483; 6,244,474; 2014/0305316; 2013/0092282; 2012/0305605; 2012/0102999; 2009/0104336; 2008/0283550; and 2008/0149669, which are also all incorporated by reference in their entirety.

The Scope of the Invention

While the invention has been described with reference to an exemplary embodiment, it will be understood by those skilled in the art that various changes may be made and equivalents may be substituted for elements thereof without departing from the scope of the invention.

In addition, may modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. A system comprising:
    a pump cartridge having a cartridge housing, the cartridge housing comprising:
        a pump cartridge mounting;
        a pump cartridge porting; and
        a motor pump unit arranged therein for pumping a fluid in the system, the motor pump unit comprising: a pump head comprising input and output porting configured to couple to the pump cartridge porting; and a motor configured to drive the pump head;
    a filter cartridge configured to receive and filter the pumped fluid and provide filtered pumped fluid, the filter cartridge configured with a filter cartridge mounting and with filter cartridge porting to receive the pumped fluid and provide the filtered pumped fluid, the pump cartridge mounting and the filter cartridge mounting being configured to match structurally; the pump cartridge porting and the filter cartridge porting also being configured to match structurally; and
    an inline mounting bracket having a plurality of inline cartridge mounting units and inline mounting bracket ports arranged in between for providing associated fluid from one inline cartridge mounting unit to an adjacent inline cartridge mounting unit, each of the inline cartridge mounting units being configured to mount either the pump cartridge or the filter cartridge, wherein one of the plurality of inline cartridge mounting units is configured to receive the pump cartridge mounting in a threaded arrangement so that the pump cartridge porting aligns with a set of the inline mounting bracket ports, and another one of the plurality of inline cartridge mounting units is configured to receive the filter cartridge mounting in a threaded arrangement so that the filter cartridge porting aligns with a corresponding set of the inline mounting bracket ports.

2. A system according to claim 1, wherein the system comprises an accumulator cartridge configured to receive and accumulate the fluid pumped by the pump cartridge.

3. A system according to claim 1, wherein the system forms part of a reverse osmosis system or a water filtration system.

4. A system according to claim 1, wherein at least one of the inline cartridge mounting units is configured to receive the pump cartridge mounting, which is rotated therein so that the pump cartridge porting aligns with the set of corresponding inline mounting bracket ports.

5. A system according to claim 1, wherein at least one of the inline cartridge mounting units is configured to receive the filter cartridge mounting, which is rotated so that the filter cartridge porting aligns with the set of corresponding inline mounting bracket ports.

6. A system according to claim 1, wherein the inline mounting bracket further comprises a cartridge mounting cap affixed to and extending from the inline mounting bracket and configured to mount the filter cartridge to the inline mounting bracket, the cartridge mounting cap comprising:
    a male threaded portion configured to mate with a female threaded mounting end of a cartridge housing of the filter cartridge to connect and disconnect the filter cartridge from the inline mounting bracket;
    a first mounting cap port arranged within the male threaded portion, configured to provide the pumped fluid to the filter cartridge, and
    a second mounting cap port arranged within the male threaded portion, configured to receive the filtered pumped fluid from the filter cartridge and in fluid communication with a porting hose configured to output the filtered pumped fluid.

7. A system according to claim 1, wherein the inline mounting bracket further comprises a cartridge mounting cap affixed to and extending from the inline mounting bracket and configured to mount the pump cartridge to the inline mounting bracket, the cartridge mounting cap comprising:
    a male threaded portion configured to mate with a female threaded mounting end of the cartridge housing of the pump cartridge to connect and disconnect the pump cartridge from the inline mounting bracket;

a first mounting cap port arranged within the male threaded portion, configured to provide a fluid input to the pump cartridge, and a second mounting cap port arranged within the male threaded portion, configured to receive the pumped fluid from the pump cartridge and in fluid communication with a porting hose configured to output the pumped fluid.

8. The system according to claim 1, wherein the motor pump unit further comprises a controller.

9. A beverage dispensing system comprising:
a pump cartridge having a cartridge housing, the cartridge housing comprising:
 a pump cartridge mounting;
 a pump cartridge porting; and
 a motor pump unit arranged therein for pumping a fluid in the beverage dispensing system, the motor pump unit comprising: a pump head comprising input and output porting configured to couple to the pump cartridge porting; and a motor configured to drive the pump head;
a filter cartridge configured to receive and filter the pumped fluid and provide filtered pumped fluid, the filter cartridge configured with a filter cartridge mounting and with filter cartridge porting to receive the pumped fluid and provide the filtered pumped fluid, the pump cartridge mounting and the filter cartridge mounting being configured to match structurally; the pump cartridge porting and the filter cartridge porting also being configured to match structurally;
an inline mounting bracket having a plurality of inline cartridge mounting units and inline mounting bracket ports arranged in between for providing associated fluid from one inline cartridge mounting unit to an adjacent inline cartridge mounting unit, each of the inline cartridge mounting units being configured to mount either the pump cartridge or the filter cartridge, wherein one of the plurality of inline cartridge mounting units is configured to receive the pump cartridge mounting in a threaded arrangement so that the pump cartridge porting aligns with a set of the inline mounting bracket ports, and another one of the plurality of inline cartridge mounting units configured to receive the filter cartridge mounting in a threaded arrangement so that the filter cartridge porting aligns with a corresponding set of the inline mounting bracket ports; and
at least one beverage dispenser configured to receive the filtered pumped fluid.

10. The beverage dispensing system according to claim 9, wherein the pump cartridge comprises a smart pump having a controller configured therein, wherein the controller is configured so that the pump cartridge provides the pumped fluid at a predetermined, constant flow and pressure; and wherein the controller is configured with a variable speed control to adjust the pump speed in response to a change in pump head pressure in order to maintain the constant flow and pressure.

11. The beverage dispensing system according to claim 9, wherein the at least one beverage dispenser comprises a plurality of beverage dispensers configured to receive the filtered pumped fluid.

12. The system according to claim 1, wherein the pump cartridge comprises a smart pump having a controller configured therein.

13. The system according to claim 12, wherein the controller is configured so that the pump cartridge provides the pumped fluid at a predetermined, constant flow and pressure.

14. The system according to claim 2, wherein the accumulator cartridge is configured to provide the fluid to the filter cartridge.

15. The system according to claim 14, wherein the system comprises a plurality of filter cartridges.

16. The beverage dispensing system according to claim 9, further comprising:
an accumulator cartridge configured to receive and accumulate the fluid pumped by the pump cartridge and provide the fluid to the filter cartridge.

17. The beverage dispensing system according to claim 16, wherein the inline mounting bracket further comprises:
a plurality of cartridge mounting caps affixed to and extending from the inline mounting bracket and configured to mount the pump cartridge, the filter cartridge and the accumulator cartridge to the inline mounting bracket, each of the plurality of cartridge mounting caps comprising:
a male threaded portion configured to mate with a female threaded mounting end of the cartridge housing of the pump cartridge, a cartridge housing of the filter cartridge or a cartridge housing of the accumulator cartridge;
a first mounting cap port arranged within the male threaded portion, configured to provide the fluid to the mated pump cartridge, filter cartridge or accumulator cartridge, and
a second mounting cap port arranged within the male threaded portion, configured to receive the fluid from the mated pump cartridge, filter cartridge or accumulator cartridge and in fluid communication with a porting hose configured to output the received fluid.

18. A system according to claim 13, wherein the controller is configured with a variable speed control to adjust pump speed in response to a change in pump head pressure in order to maintain the constant flow and pressure.

19. A system according to claim 12, wherein the controller is configured to respond to a pressure signal containing information about the pressure of the pumped liquid.

* * * * *